Jan. 9, 1951 M. TOURNEUR ET AL 2,537,717
APPARATUS FOR CUTTING BEET SEED GLOMERULES
TO PREPARE MONOGERMINAL SEEDS
Filed June 29, 1948 5 Sheets-Sheet 1
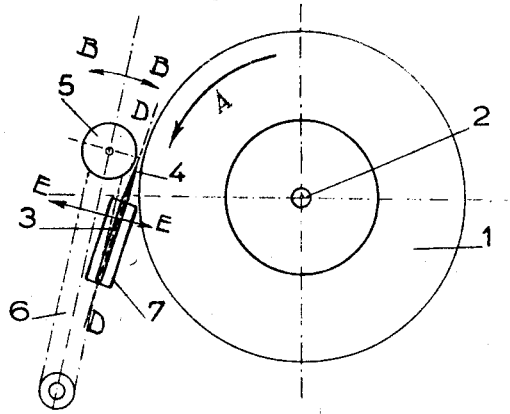
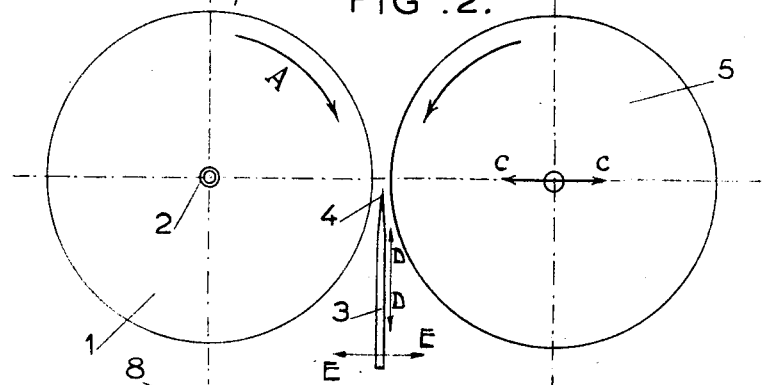
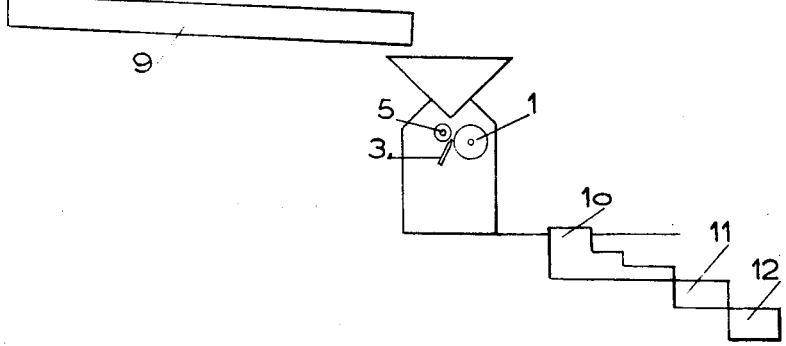
INVENTORS
MAURICE TOURNEUR &
JEAN RENAULT
By Hang, Emery & Thompson Attys.

INVENTORS
MAURICE TOURNEUR &
JEAN RENAULT
BY Young, Emery & Thompson
ATT'S.

Jan. 9, 1951   M. TOURNEUR ET AL   2,537,717
APPARATUS FOR CUTTING BEET SEED GLOMERULES
TO PREPARE MONOGERMINAL SEEDS
Filed June 29, 1948   5 Sheets-Sheet 4

INVENTORS
MAURICE TOURNEUR &
JEAN RENAULT
By Young, Emery & Thompson
Attys.

Jan. 9, 1951   M. TOURNEUR ET AL   2,537,717
APPARATUS FOR CUTTING BEET SEED GLOMERULES
TO PREPARE MONOGERMINAL SEEDS
Filed June 29, 1948   5 Sheets-Sheet 5

INVENTORS
MAURICE TOURNEUR &
JEAN RENAULT
By Young, Emery & Thompson
Attys.

Patented Jan. 9, 1951

2,537,717

UNITED STATES PATENT OFFICE 2,537,717

APPARATUS FOR CUTTING BEET SEED GLOMERULES TO PREPARE MONO-GERMINAL SEEDS

Maurice Tourneur, Coulommiers, and Jean Renault, La Ferte-Sous-Jouarre, France, assignors to Societe Generale Meuliere La Ferte-Sous-Jouarre (Seine and Marne), a corporation of France Application June 29, 1948, Serial No. 35,856
In France July 19, 1947

4 Claims. (Cl. 146—72)

This invention relates to an apparatus for preparing monogerminal beet seed.

It is known that the seeds of beet occur naturally in the form of glomerules containing a collection of grains. When sown in this form, the beet glomerules give a number of plants which must subsequently be thinned out. This thinning out constitutes a serious difficulty in the culture of beet. It requires a lengthy and difficult operation which necessitates a large amount of labour which it is increasingly difficult to find.

In order to avoid thinning out, it has been proposed to prepare the seeds before sowing them by dissociating the glomerules in order to obtain "monogerminal" grains, i. e. grains containing a single germ, which can be sown one at a time and each of which produces only a single plant. The preparation consists in breaking the glomerules by passing them through grinders of the kind used in milling.

Regardless of the care given, the grinding of glomerules only produces uncertain or incomplete results. On the one hand, the dissociation of the glomerules is never complete, so that the seeds thus prepared still contain a collection of grains which are not dissociated. On the other hand, there is produced a crushing of a part of the seeds and a large amount of waste, and in particular, broken grains, which are completely lost.

The present invention concerns an apparatus for effecting the segmentation of the glomerules in a satisfactory manner by cutting the glomerules without crushing them.

The apparatus according to the invention is illustrated by way of example, in the accompanying drawings, in which:

Figure 1 is a diagrammatic view of the apparatus,

Figure 2 shows, also diagrammatically, a modification,

Figure 3 is a diagram showing the application of the apparatus with means for preliminary and subsequent treatments.

Figure 4:
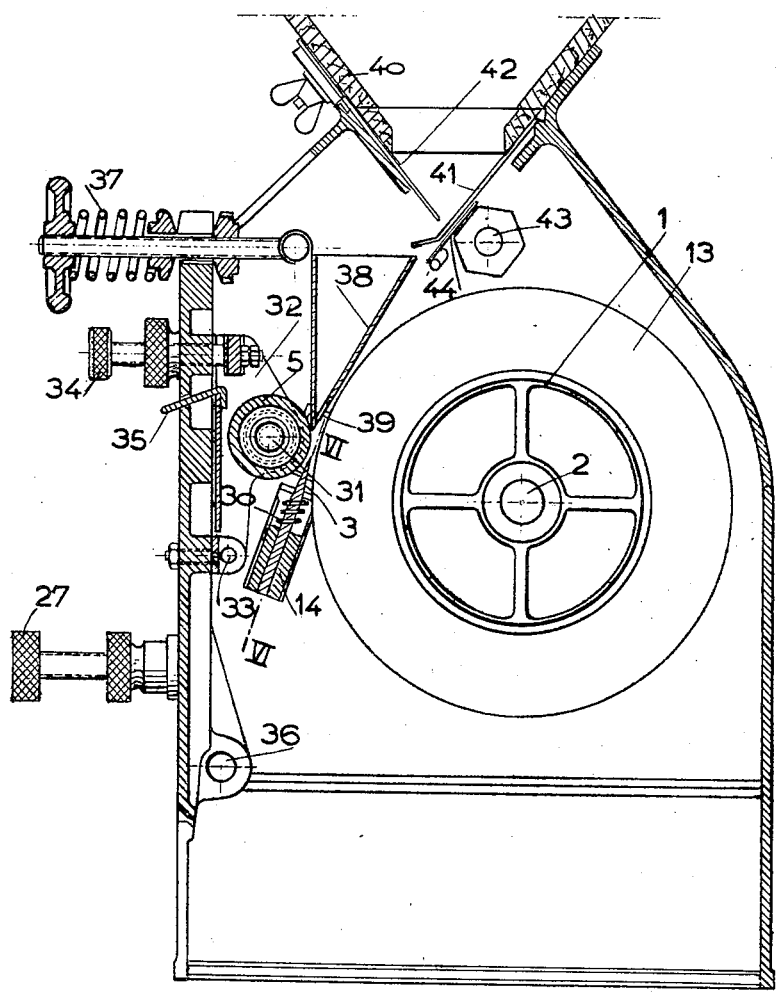
Figure 4 is a vertical cross-sectional view of the apparatus for dividing the glomerules.

The apparatus according to the invention comprises a roller 1, to which a continuous rotational movement in the direction A about the axis 2 is imparted, and a knife 3, the cutting edge 4 of which is situated slightly above the horizontal plane of the shaft 2 of the cylinder 1. At the same time, there is imparted to the cylinder 1 a transverse reciprocating motion perpendicular to the plane of Figure 1 and in the direction of its shaft 2.

The glomerules taken up by the cylinder 1 are carried by it against the knife 3. The edge 4 immediately cuts them into two parts. The transverse movement of the cylinder 1 facilitates the work producing a rolling action of the glomerules which tends to produce an effective action of the edge 4 on any glomerule which may have escaped being carried along by the rotation alone.

To guide the glomerules and to apply them against the cylinder 1, a second cylinder 5 is provided which is adapted to move with respect to the cylinder 1.

In the case of Figure 1, in which the knife 3 is disposed obliquely, the cylinder 5 is smaller than the cylinder 1. The cylinder 5 is mounted loose on a pivoting arm 6 by means of which it can be adjusted in the direction B—B. In the case of Figure 2, in which the knife 3 is located vertically, the cylinder 5 has the same or substantially the same diameter as the cylinder 1. The said cylinder 5 can move also in the direction C—C for purposes of adjustment.

The knife 3 must be accurately adjustable with respect to the cylinder 1. For this purpose, it is mounted on a support 7 by means of which the height of the cutting edge 4 can be exactly determined by imparting thereto a movement in the direction D—D, and the distance of the said edge 4 from the cylinder 1 can be adjusted by a movement in the direction E—E. These arrangements have the object of enabling the adjustment to be adapted to the size of the grains. Besides, the knife 3 can receive an alternative movement in the blade direction, that is to say perpendicular to the plan of the figure. This movement has for advantage, after a certain time of working, to remedy the irregularities that the edge 4 may have. Preferably, this translation movement is fast, and produced by any appropriated means such as, a vibrator for instance. The use of the apparatus may include a number of successive passes. Although a single pass is sufficient with grains of small dimensions to produce complete division, it may be that with larger grains a plurality of operations are necessary with different spacings.

To facilitate the operation, it is advantageous to supply the apparatus with glomerules which have previously been "densified," that is to say which have undergone a separation according to size and a preparation such as passage through a friction device which eliminates certain impurities. As will be seen from Figure 3, the glomerules first of all pass through a friction drum 8, which is a cylinder having an emery coating, and then through a separator 9. The glomerules thus prepared and to a certain extent sorted according to size or density, are subjected to the treatment between the cylinder 1 and the knife 3 comprising one or more operations. After passing through this apparatus, by which the glomerules are divided, the product is freed from the coatings or parasitic elements at 10, for example by suitably controlled aspiration in stages. The monogerminal grains obtained are then cleaned at 11 on a densimetric table. They can in addition be polished at 12 to obtain grains of regular form, whereby passage through the channels of the sowing machine is facilitated, and they are subjected to any treatments likely to facilitate sowing or germination.

Figure 5:
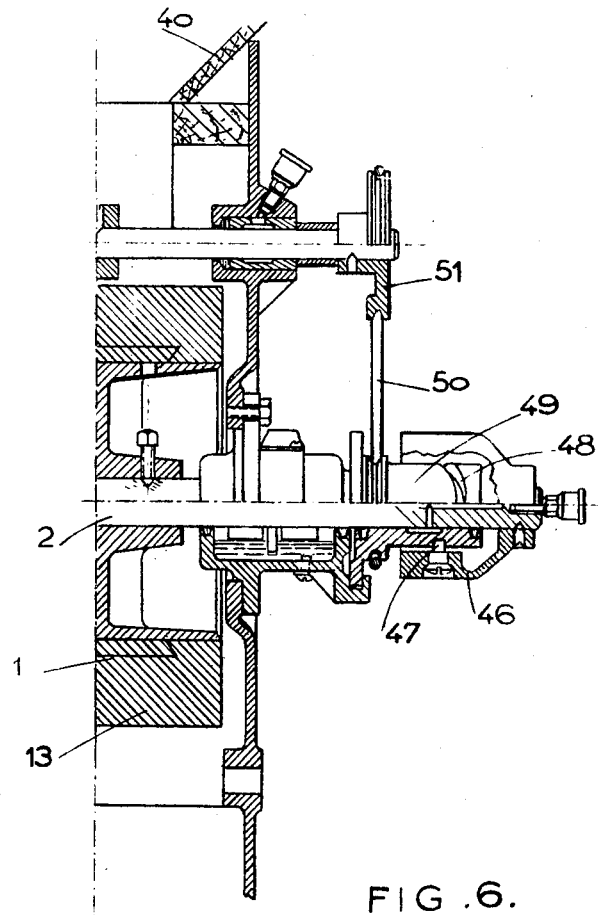
Figure 5 is a longitudinal half-section.
Figure 6:
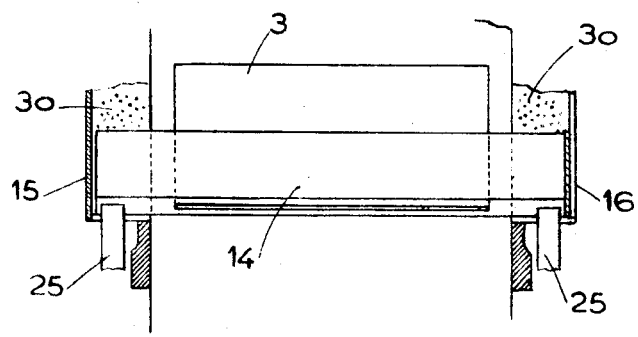
Figure 6 is a fragmentary section on the line VI—VI of Figure 4.
Figure 7:
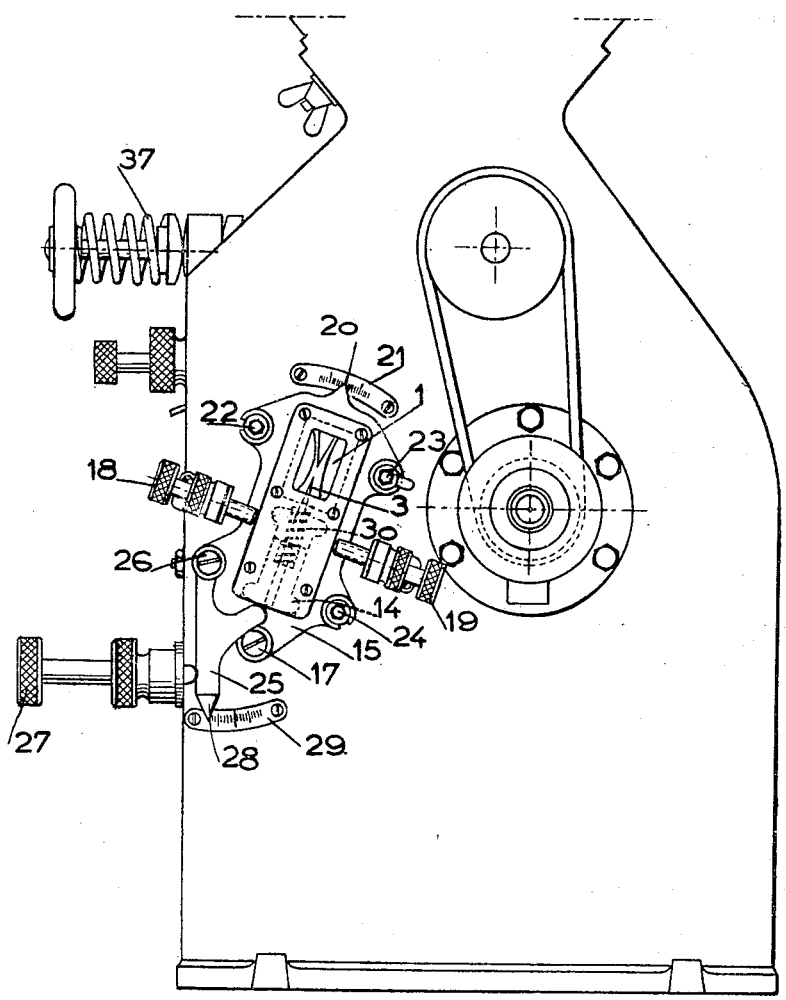
Figure 7 is a side elevation.
Figure 8:
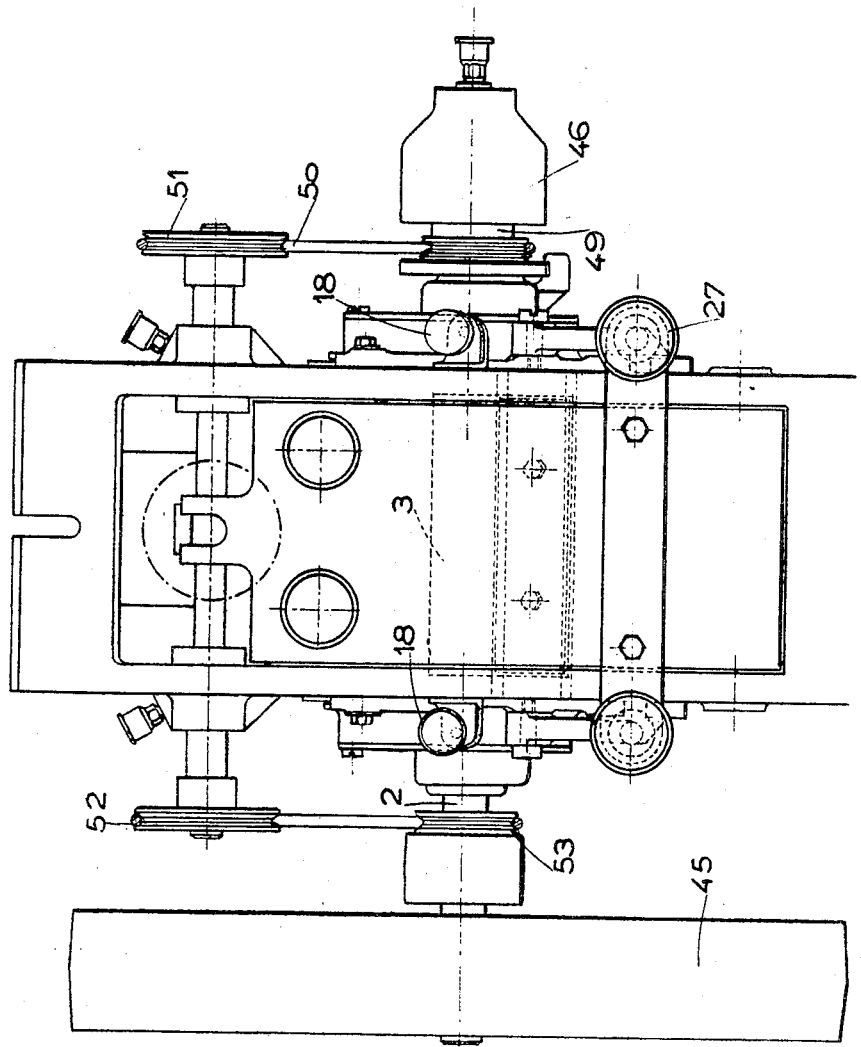
Figure 8 is a profile view.

An embodiment of the apparatus for dividing the glomerules is illustrated in Figures 4 to 8.

This apparatus is composed of a cylinder 1 rotating about a shaft 2. The cylinder 1 comprises a suitable covering 13 for ensuring adherence of the glomerules under treatment. The said covering may consist, for example, of an abrasive material similar to that used in the usual mills. However, it may also comprise a covering of another material, such as silex, agglomerate, rubber, or plastic material. It may also consist of metal or an alloy. The said cylinder is rotated by the shaft 2 and there is at the same time imparted thereto a transverse translational movement as will hereinafter be described.

In combination with the cylinder 1 there is disposed a knife 3 mounted on a support 14. The said support 14 consists of a double transverse blade gripping the knife 3 and bearing at its two extremities against side plates 15 and 16 comprising adjustment means.

For this purpose, the plates 15 and 16 are so mounted as to be able to rock about a pin 17. Two micrometric screws 18 and 19 are provided so that the plates and consequently the position of the knife may be moved by controlled amounts. A pointer 20 serves to indicate the position on a scale 21. Locking screws 22, 23 and 24 serve to secure the side plates when the position thereof has been exactly adjusted.

To ensure adjustment of the knife in the vertical direction, a finger 25 pivoted at 26 and controlled by a screw 27 bears against the knife holder 14. The movements of the finger are indicated by the pointer 20 moving along the scale 29. Springs 30 ensure constant contact of the knife holder 14 with the finger 25. It will thus be seen that the knife 3 can readily be adjusted with precision both in position and in its distance from the cylinder 1.

A second cylinder 5 consisting of metal or having any desired covering is mounted loose on a shaft 31 secured on a support 32. The support 32 is adapted to pivot about a shaft 33 under the action of a control screw 34. When the said screw 34 is actuated, the cylinder 5 can be moved towards or away from the cylinder 1 to any desired extent. The displacements are controlled by a tongue 35 projecting outside the apparatus.

The combination comprising the cylinder 5 and the support 32 thereof is mounted on the forward part of the apparatus, which part can be opened by pivoting about the pin 36 for internal inspection. The said part of the apparatus is closed by means of a resilient member such as a spring 37.

The cylinder 5, instead of turning loosely on its shaft 31, can be fixed to the said shaft and driven thereby with the aid of any suitable means which will enable the speed of rotation thereof to be controlled as required.

The arrangement comprises in addition a feed spout such as 38 through which the glomerules are delivered near to the knife 3 through an orifice 39. The said spout is in turn fed through a feed hopper 40. This hopper comprises at its lower part a pan 41 and a control plate 42. The pan 41 is adapted to be shaken by means of a jolting member 43 through an eccentric control member 44. These arrangements enable the glomerules which are to be divided to be fed regularly and continuously into the apparatus.

The apparatus may be driven by any desired means, for example, by a pulley 45 which drives the shaft 2 of the cylinder 1 which supports at its extremity a hood-like cover 46 in which a stud 47 is secured. The stud 47 is engaged in a helical groove 48 in a sleeve 49. The said sleeve 49 is driven by a belt 50 actuated by pulleys 51, 52 and 53. By suitably selecting the diameters of the pulleys, there is imparted to the sleeve 49 a speed which differs slightly from that of the shaft. Consequently, owing to the action of the helical groove 48 and of the stud 49, a transverse reciprocating movement is imparted to the shaft 2 and consequently to the cylinder 1.

The glomerules fed into the hopper 40 pass between the plate 41 and the plate 42 and into the feed spout 38. At the bottom of the said spout they are driven by the combined action of the two cylinders 1 and 5, the spacing between which is suitably controlled. They are thus applied against the edge 4 of the knife 3, which frees the grains, which fall into the lower part of the apparatus.

We claim:

1. An apparatus for preparing beet-seeds from natural glomerules comprising a cylinder mounted with its axis horizontal, means for rotating the cylinder about its axis, means for reciprocating the cylinder axially, a second cylinder having its axis parallel to said first cylinder axis and rotated in a reverse direction from said first cylinder, a knife member positioned in the nip between said cylinders perpendicular to the line connecting the axes of said cylinders with its cutting edge parallel to the cylinder axes and located adjacent said line connecting the cylinder centers, said cylinders rotating in a direction to feed seeds in the nip of the cylinders to said knife, and means for supplying glomerules to the nip between said cylinders to feed them along to the knife by the rotation of said cylinders.

2. An apparatus for preparing monogerminal beet-seeds from natural glomerules comprising a cylinder mounted with its axis horizontal, means rotating the cylinder about its axis, means axially reciprocating said cylinder, a second cylinder having its axis parallel to that of the first cylinder and rotated in reverse from said first cylinder, means for adjusting the spacing of said second cylinder with respect to said first cylinder axis, a knife member positioned in the nip between said cylinders perpendicularly to the line connecting the axes thereof, with its cutting edge parallel to said axes and located adjacent said center-connecting line, said cylinders rotating in a direction to feed seeds in the nip of the cylinders to said knife, and means for supplying glomerules to the nip between said cylinders to feed them along to the knife in the rotation of said cylinders.

3. An apparatus for preparing monogerminal beet-seeds from natural glomerules comprising a cylinder mounted with its axis horizontal, means rotating the cylinder about its axis, means axially reciprocating said cylinder, a second cylinder having its axis parallel to that of the first cylinder in a common horizontal plane therewith and rotated in reverse from the rotation of said first cylinder, a vertical knife disposed in the nip between the cylinders with its horizontal cutting edge parallel to the cylinder axes and in the same horizontal plane as said axes, said cylinders rotating in a direction to feed seeds in the nip of the cylinders to said knife, and means for supplying glomerules to the nip between said first and second cylinders to feed them through said cylinders to the knife.

4. An apparatus for preparing monogerminal beet-seeds from natural glomerules comprising a cylinder mounted with its axis horizontal, means rotating the cylinder about its axis, means axially reciprocating said cylinder, a second cylinder having its axis parallel to said first cylinder in a common horizontal plane therewith and rotated in reverse from said first cylinder, a vertical knife member in the nip of the cylinders with its horizontal cutting edge parallel to the cylinder axes and in a common horizontal plane therewith, means for reciprocating said knife member longitudinally in a horizontal direction, said cylinders rotating in a direction to feed seeds in the nip of the cylinders to said knife, and means for supplying glomerules to the nip between the cylinders to feed them through said cylinders to the cutting edge of said knife.

MAURICE TOURNEUR.
JEAN RENAULT.

REFERENCES CITED

The following references are of record in the file of this patent:

UNITED STATES PATENTS

| Number | Name | Date |
|---|---|---|
| 156,489 | McKay | Nov. 3, 1874 |
| 249,804 | Stein | Nov. 22, 1881 |
| 704,610 | Black | July 15, 1902 |
| 1,790,592 | Morrison | Jan. 27, 1931 |
| 2,075,159 | Andreasen | Mar. 30, 1937 |
| 2,215,114 | Beader | Sept. 17, 1940 |

FOREIGN PATENTS

| Number | Country | Date |
|---|---|---|
| 246,069 | Great Britain | Jan. 21, 1926 |
| 375,015 | Great Britain | June 23, 1932 |